(12) United States Patent
Scholz

(10) Patent No.: US 9,768,836 B2
(45) Date of Patent: Sep. 19, 2017

(54) INDUCTIVE ENERGY SUPPLY UNIT

(71) Applicant: Phoenix Contact GmbH & Co. KG, Blomberg (DE)

(72) Inventor: Peter-Dominik Scholz, Brakel (DE)

(73) Assignee: PHOENIX CONTACT GmbH & CO. KG, Blomberg (DE)

( * ) Notice: Subject to any disclaimer, the term of this patent is extended or adjusted under 35 U.S.C. 154(b) by 331 days.

(21) Appl. No.: 14/371,622

(22) PCT Filed: Jan. 11, 2013

(86) PCT No.: PCT/EP2013/050494
§ 371 (c)(1),
(2) Date: Jul. 10, 2014

(87) PCT Pub. No.: WO2013/104759
PCT Pub. Date: Jul. 18, 2013

(65) Prior Publication Data
US 2014/0361634 A1    Dec. 11, 2014

(30) Foreign Application Priority Data

Jan. 12, 2012 (DE) .................. 10 2012 000 408

(51) Int. Cl.
*H01F 27/42* (2006.01)
*H01F 37/00* (2006.01)
(Continued)

(52) U.S. Cl.
CPC ............ *H04B 5/0037* (2013.01); *G02B 6/00* (2013.01); *H01F 38/14* (2013.01); *H02J 7/025* (2013.01);
(Continued)

(58) Field of Classification Search
CPC .. H02J 5/005; H02J 7/025; H02J 17/00; H02J 50/12; H02J 50/10; H02J 50/80;
(Continued)

(56) References Cited

U.S. PATENT DOCUMENTS 6,803,744 B1  10/2004  Sabo
7,262,700 B2   8/2007  Hsu
(Continued)

FOREIGN PATENT DOCUMENTS

CN    101517666 A     8/2009
DE    10039707 A1     3/2002
(Continued)

OTHER PUBLICATIONS

Officer: Satu Tschubel, "Related International Patent Application No. PCT/EP2013/050493", "International Search Report and Written Opinion", Mar. 26, 2013, Publisher: PCT, Published in: EP.
(Continued)

*Primary Examiner* — Jared Fureman
*Assistant Examiner* — Esayas Yeshaw
(74) *Attorney, Agent, or Firm* — Kaplan Breyer Schwarz, LLP

(57) ABSTRACT

A device for supplying electrical energy and/or supplying data to an electronic module, comprising a transmitting coil that has a coil axis and at least two energy receiving parts that are arranged side by side and have receiving coils, the coil axes of which run in the same direction or run parallel to the transmitting coil axis. Each of the coils is integrated in resonance circuits. The energy receiving parts supply electronics and, together with the same, are galvanically separated from one another by an insulating area of separation which is bridged by a data signal coupling line.

15 Claims, 2 Drawing Sheets

(51) Int. Cl.
*H04B 5/00* (2006.01)
*H04L 12/10* (2006.01)
*G02B 6/00* (2006.01)
*H01F 38/14* (2006.01)
*H02J 7/02* (2016.01)

(52) U.S. Cl.
CPC ........... *H04B 5/005* (2013.01); *H04B 5/0031* (2013.01); *H04B 5/0093* (2013.01); *H04L 12/10* (2013.01)

(58) Field of Classification Search
CPC .. H02J 50/90; H02J 50/60; H02J 50/40; H02J 50/20; H02J 2007/0096; H02J 7/0042; H02J 50/00; H02J 50/27; H02J 7/00
USPC ......................................................... 307/104
See application file for complete search history.

(56) References Cited

U.S. PATENT DOCUMENTS

| | | | |
|---|---|---|---|
| 9,099,880 B2 * | 8/2015 | Wesemann | H02J 5/005 |
| 9,331,495 B2 * | 5/2016 | Soar | H02J 5/005 |
| 2002/0021226 A1 | 2/2002 | Clement et al. | |
| 2003/0210106 A1 | 11/2003 | Cheng et al. | |
| 2005/0189945 A1 | 9/2005 | Reiderman | |
| 2006/0165039 A1 | 7/2006 | Lyon et al. | |
| 2007/0019357 A1 * | 1/2007 | Keely | H05C 1/06 361/232 |
| 2007/0033153 A1 * | 2/2007 | Yamanaka | G01V 1/008 706/21 |
| 2008/0179963 A1 | 7/2008 | Fouquet et al. | |
| 2009/0072629 A1 * | 3/2009 | Cook | H02J 17/00 307/104 |
| 2010/0285747 A1 | 11/2010 | Bauer et al. | |
| 2010/0314946 A1 * | 12/2010 | Budde | H02J 5/005 307/104 |
| 2010/0328044 A1 | 12/2010 | Waffenschmidt et al. | |
| 2011/0127845 A1 | 6/2011 | Walley et al. | |
| 2011/0181238 A1 * | 7/2011 | Soar | B60N 2/24 320/108 |
| 2011/0255259 A1 * | 10/2011 | Weber | H04M 1/026 361/807 |
| 2012/0007437 A1 * | 1/2012 | Fells | H01F 38/14 307/104 |
| 2012/0032632 A1 * | 2/2012 | Soar | H01F 38/14 320/108 |
| 2012/0049620 A1 | 3/2012 | Jansen | |
| 2012/0104999 A1 | 5/2012 | Teggatz et al. | |
| 2012/0112552 A1 * | 5/2012 | Baarman | H05K 9/002 307/104 |
| 2012/0217111 A1 * | 8/2012 | Boys | H01F 38/14 191/10 |
| 2012/0313447 A1 | 12/2012 | Park et al. | |
| 2013/0270921 A1 | 10/2013 | Boys et al. | |
| 2014/0111147 A1 * | 4/2014 | Soar | H01F 27/365 320/108 |
| 2014/0292101 A1 | 10/2014 | Baarman et al. | |
| 2015/0326028 A1 | 11/2015 | Suzuki et al. | |

FOREIGN PATENT DOCUMENTS

| | | |
|---|---|---|
| DE | 102007060811 A1 | 3/2009 |
| DE | 102007061610 B4 | 1/2010 |
| EP | 1885085 A1 | 2/2008 |
| EP | 2073315 A2 | 6/2009 |
| EP | 2067148 B1 | 6/2011 |
| WO | 9815069 A1 | 4/1998 |
| WO | 2008118178 A1 | 10/2008 |
| WO | 2010125048 A1 | 11/2010 |

OTHER PUBLICATIONS

"Office Action", issued in related Chinese Patent Application No. 201380005289.X, dated Jul. 2, 2015, Published in: CN.

Jochen Helms, "Related International Application No. PCT/EP2013/050494", "International Search Report", Jun. 19, 2013, Publisher: PCT, Published in: EP.

"German Office Action" issued in related application No. 10 2012 000 408.7 dated Nov. 21, 2012.

"German Office Action", issued in related application No. 10 2012 000 409.5 dated Nov. 21, 2012.

"Related International Application No. PCT/EP2013/050494", "Translation of the International Preliminary Report on Patentability", Jul. 24, 2014, Publisher: PCT / IB of WIPO, Published in: CH.

"Related International Application No. PCT/EP2013/050493", "Translation of the International Preliminary Report on Patentability", Jul. 24, 2014, Publisher: PCT / IB of WIPO, Published in: CH.

"Non Final Office Action" Dated Oct. 3, 2016 in Related U.S. Appl. No. 14/371,644.

"Notice of Allowance" dated May 18, 2017 in related U.S. Appl. No. 14/371,644.

* cited by examiner

INDUCTIVE ENERGY SUPPLY UNIT

FIELD OF THE INVENTION

The invention relates to a device for supplying electrical energy and/or supplying data to one or a plurality of electronic modules.

BACKGROUND OF THE INVENTION

For galvanically separated power supply, transformers or energy transmitters having a primary coil and a secondary coil which form an isolating distance are frequently used. In EP 1 885 085 A1 there are, separated from one another, an energy transmission interface and a data transmission interface for contactless connection of a bus subscriber. Two secondary windings and two processing units per bus subscriber are not provided.

Also, interfaces are known via which, in addition to energy, signals or data can also be transmitted bidirectionally. In WO 98/15069 A1, a ferromagnetic core limb provided with a primary coil for energy transmission and with a primary coil for data transmission in interaction with a ferromagnetic core limb provided with a secondary coil for energy input and a secondary coil for data acquisition is used. While there is a potential separation with good electrical insulation between the primary side and the secondary side, such a potential separation with good electrical insulation does not exist between the energy side and the data side. Because of the ferromagnetic limbs, relatively free positioning between primary and secondary sides is not possible.

From WO 2010/125048 A1, a system for contactless data and energy supply from a mounting base to bus subscriber modules is known, wherein a supply rail with energy transmission interfaces and data transmission interfaces is provided, and the bus subscriber modules each have a corresponding energy transmission interface and a corresponding data transmission interface. In the case of inductive energy and data transmission, the interface comprises a primary coil with a coil axis perpendicular to the supply rail, and for each bus subscriber module it comprises in each case one secondary-side coil with a coil axis likewise perpendicular to the supply rail.

In WO 2008/118178 A1, the wireless energy transmission is operated by means of resonant fields over a certain distance. This results in potential separation between an electrical energy supply unit and an energy consumer unit, but not in a separation between three potential groups.

From EP 2 067 148 B1, a charging device for a plurality of electronic devices is known, wherein the primary winding comprises a plurality of overlapping coil elements at a contact surface, and the secondary windings receive electromagnetic energy upon positioning on the contact surface. The primary winding is arranged as part of a resonant circuit and includes a capacitor for adapting the resonance frequency of the resonant circuit to the operating frequency. The electronic devices to be charged have no signal-data coupling section between adjacent electronic devices.

SUMMARY OF THE INVENTION

It is an object of the invention to provide a device for contactless supply of electrical energy and data to an electronic module, wherein the electronic module has to meet increased safety requirements.

According to the invention, two energy receiving parts that are galvanically separated from one another and from the energy supply part are supplied by one energy supply part, via which data signals can also be transferred. The energy receiving parts each are allocated their own signal terminals so that the electronic module formed meets increased safety requirements at all electrical connections in terms of flashover.

In a preferred embodiment, a transmitting coil for producing an alternating magnetic field, a first receiving coil in inductive coupling with the transmitting coil, at least one second receiving coil inductively coupled to the transmitting coil, at least one second receiving coil inductively coupled to the transmitting coil, a transmitting capacitor for forming a receive-resonance circuit with the transmitting coil, a first receiving capacitor for forming a first receive-resonance circuit with the first receiving coil, a second receiving capacitor for forming a second receive-resonance circuit with the second receiving coil, a first electronics connected as load to the first receiving coil and a second electronics connected as load to the second receiving coil are provided, wherein the first receive-resonance circuit comprising a first electronics and the second receive-resonance circuit comprising a second electronics are arranged separated from one another in terms of potential by an insulating area of separation. The first resonance circuit comprising a first electronics and the at least one second resonance circuit comprising a second electronics form the electronic module in which between first and the at least one second receive-resonance circuit an insulating area of separation is provided which can be bridged by a data signal coupling line. A plurality of adjacent electronic modules with a number of transmitting coils are supplied with energy.

The characteristic of the galvanic separation between transmitting coil and associated electronic module and also within the electronic module determines the insulation class for which the transmission devices between the separated potential groups have to be designed. With the concept with which the device according to the invention is produced, relatively large distances between transmitting coil and receiving coil and also between receiving coils galvanically to be separated from one another can be provided so that a high insulation class can be implemented. This concept also allows to provide the supply terminals of the transmitting module at the sides of the device that are located remote from the signal connectors of the electronic module, and to attach at the signal connectors the input terminals and output terminals on opposite sides of the module.

In a preferred embodiment of the invention, the first receive-resonance circuit comprising a first electronics and the at least one second receive-resonance circuit comprising a second electronics are accommodated on a common circuit board. This allows building narrow units relative to the transmitting coil which can extend along an elongated holding device, for example, a support rail. In this manner, a plurality of electronic modules can be positioned next to one another in order to be fixed by the holding device.

If the first electronics has signal input connectors and the second electronics has signal output connectors it is advantageous to accommodate the first and second electronics on a common circuit board and to connect the first electronics to the second electronics via a data signal coupling line. In this embodiment, the signal connectors are arranged on opposite side of the electronics, that is, at the greatest insulation distances possible.

According to a preferred embodiment of the invention, the transmitting coil is provided with helical turns and a cylindrical contour for producing axially parallel flux lines, in relation to which the receiving coils with their reception planes are arranged in the transverse direction.

As is well known, a coil having helical turns produces magnetic flux lines which, inside the coil, extend parallel to the coil axis and bend outwards outside of the coil and turn round and run parallel or almost parallel to the coil axis in order to bend inward again towards the inside of the coil. Axially parallel flux lines stand perpendicular or almost perpendicular on planes spanned by the receiving coils so that effective coupling between transmitting coils and receiving coils takes place. If the receiving coils are accommodated on a circuit board, it is advantageous to let the turns extend spirally. Such coils can be produced in a cost-effective manner and have a large capture cross-section for flux lines.

Industrial installations often need numerous electronic modules which are often fixed along a holding device within control cabinets. For such an application, the invention provides to arrange a number of transmitting coils along the holding device, and a plurality of electronic modules equipped with at least two receiving coils can be positioned relatively free in a row along the holding device and can be secured thereon. In this manner it is possible, to supply electrical energy to a plurality of electronic modules, each of which can have different dimensions, wherein insulation is provided to a large extent by galvanically separating power supply and signal processing or data processing, and in addition, signal or data processing can achieve a high insulation class.

BRIEF DESCRIPTION OF THE DRAWINGS

Two exemplary embodiments of the invention are described by means of the drawing. In the figures.

DETAILED DESCRIPTION

Figure 1:
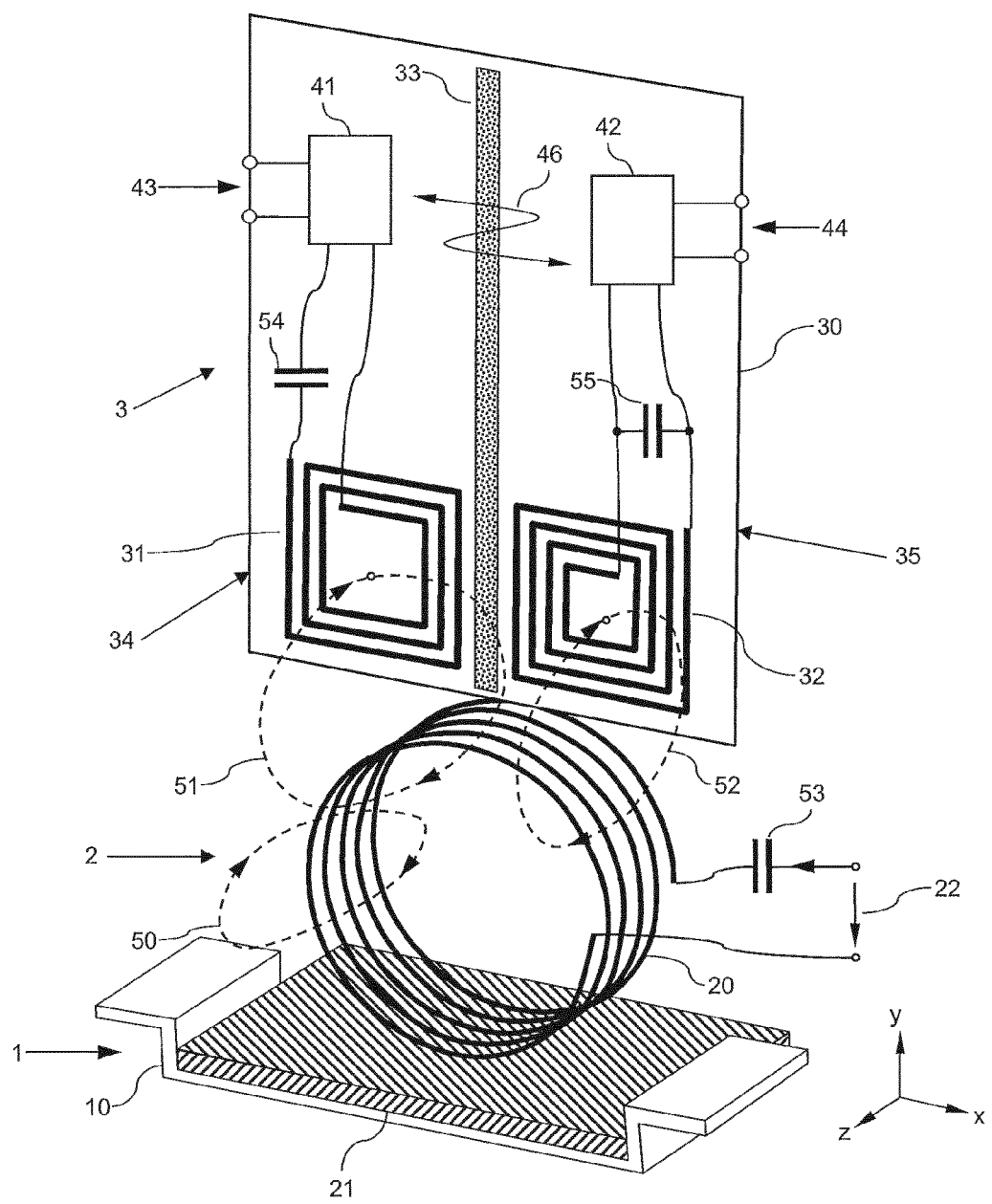
FIG. 1 shows a schematic illustration of an electronic module with energy supply and signal or data processing.

On a support rail 10 of an elongated module holding device 1, a transmitting coil 20 is secured which is supplied via an alternating input voltage 22 and thus acts as energy supply part 2. At a certain distance from the transmitting coil 20, a circuit board 30 is held by means of a housing 4 (FIG. 2) which is supported on the rail 10. Two spiral-shaped flat receiving coils 31, 32 which are separated from one another by an insulating area of separation 33 are fitted as conductor paths on the circuit board 30. The first receiving coil 31 is connected to a first electronics 41 and the second receiving coil 32 is connected to a second electronics 42. The components 31, 41, 54 form a first energy receiving part 34, and the components 32, 42, 55 form a second energy receiving part 35 of an electronic module 3.

The first electronics 41 can represent a signal or data input electronics and the second electronics 42 can be a signal or data output electronics of the electronic module 3. The two electronics 41, 42 are connected to one another via a data signal coupling line 46 in order to exchange data or signals between the electronics. The coupling line 46 can be formed by coupling elements which can represent an optical signal line; however, other transmission methods with capacitive or inductive coupling elements can also be used. As an alternative, the magnetic coupling between the coils 31 and 32 can also be utilized for signal or data transfer.

The transmitting coil 20 is helically wound and has a coil axis parallel to the longitudinal extent of the support rail 10. The receiving coils 31 and 32 are spirally wound and have coil axes that run parallel to one another and to the transmitting coil axis.

If the transmitting coil 20 is excited via the alternating supply voltage 22, an alternating magnetic field is created, of which some flux lines 50, 51,52 are outlined. The magnetic field portion illustrated by the flux line 51 passes through the flat receiving coil 31. Accordingly, the magnetic field portion illustrated by the flux line 52 passes through the flat receiving coil 32, while the flux line 50 represents the stray field. However, when the coil 20 is excited, capacitance effects act in addition to inductance between the coil turns, that is, the coil 20 as such already forms an electrical resonance circuit with a particular natural resonant frequency. The latter can be trimmed by means of one or more capacitors to a particular value which, for example, can correspond to the operating frequency of the input voltage. The capacitive influences of the vibratory system are symbolized by the total capacitance 53.

In practice, this capacitance can be formed by a series capacitor. Alternatively or additionally, a parallel capacitor can also be used. Finally, it is also possible to geometrically form the coil in such a manner that the operating frequency of the input voltage 22 corresponds to the natural resonant frequency of the coil 20 so that no discrete capacitor is needed, i.e., the total capacitance 53 is exclusively composed of the parasitic coupling capacitances of the coil turns.

If the coil 20 is excited, the coils 31 and 32 are also excited as a result of the inductive coupling. Here too, capacitance effects occur between the individual coil turns. For adapting to a common or almost common resonant frequency between the oscillating circuits with the coils 20, 31, 32, the capacitance effects between the individual coil turns can be specifically utilized, or capacitors in series connection or in parallel connection or in combination of these two circuit types are likewise utilized here so as to set a suitable capacitance 54, 55 by means of which the receiving circuits can be operated at resonant frequency.

In order to limit harmful effects of leakage inductance, shielding materials, for example from ferrite material, can be provided. Such a shielding plate 21 extends between transmitting coil 20 and rail 10. The receiving coils 31, 32 can also be shielded with respect to adjacent coils by ferrite material.

The insulating area of separation 33 can be created in that insulating material is located there which is not penetrated by conductor paths or other electronic components. The electronics 41, 42 as well as the signal terminals 43 and 44 can be attached on different sides of the circuit board 30. The electronic module 3 is secured in the housing 4 (FIG. 2) in such a manner that the signal terminals 43, 44 are accessible for plug connectors, for example.

The housing 4 is suited for being fastened as a plurality of identical housings arranged next to one another on a holding device 1, for example in the form of the rail 10, and thus to be arranged next to one another held in a row as a plurality of electronic modules 3 along the elongated holding device 1. Furthermore, a number of transmitting coils 20 which are aligned with one another and with which the electronic modules can be aligned extend along the holding device 1. The plurality of electronic modules 3 does not have to correspond to the number of transmitting coils 20. On the one hand, the electronic modules can be built particularly narrow; on the other, it is also possible to accommodate particularly wide electronic modules in the row of electronic modules. Overall, a system consisting of electrical energy supply and of a plurality of electronic modules can be created, in which increased insulation between separated potential groups is created.

Figure 2:
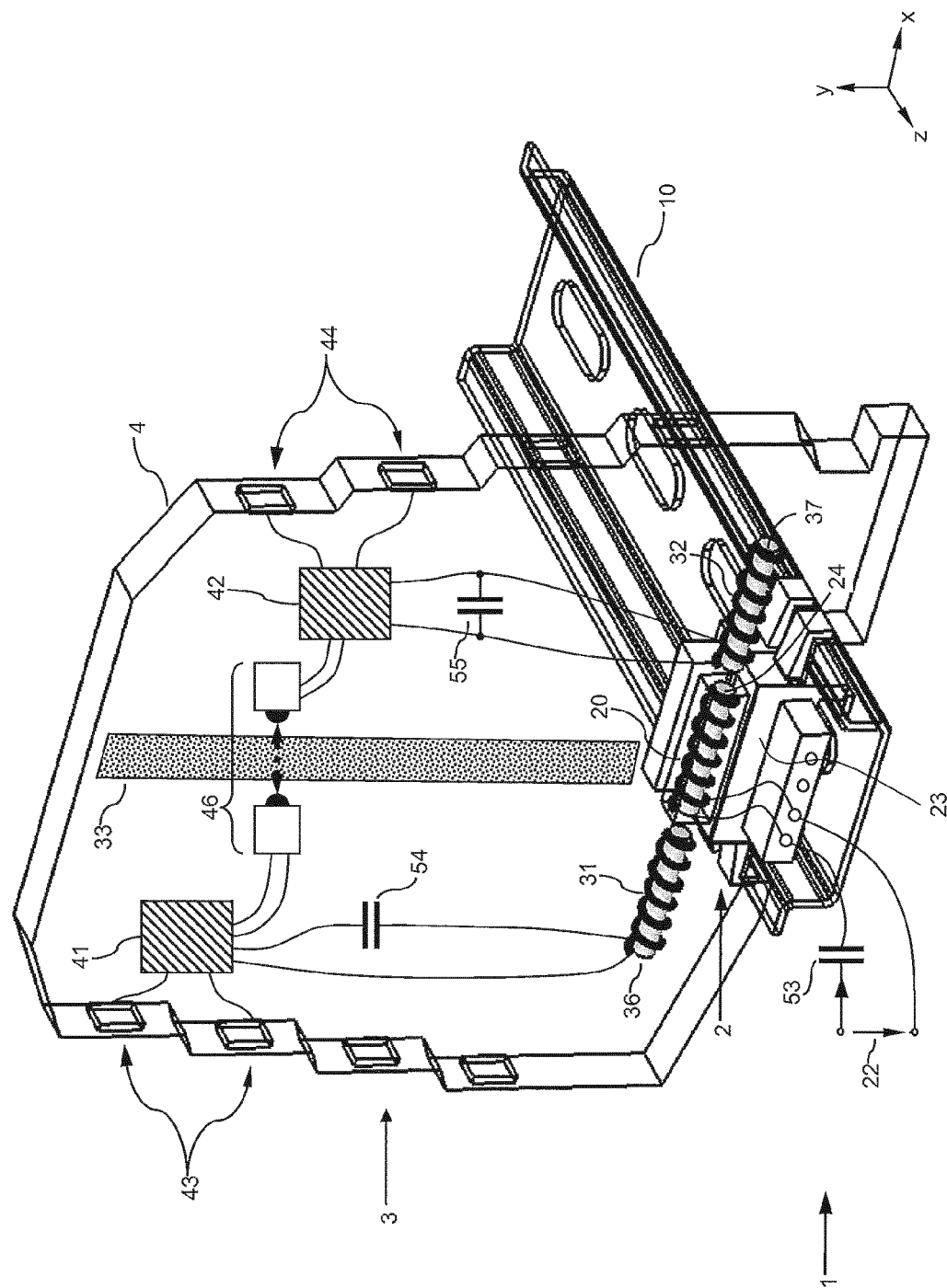
FIG. 2 shows coupling of the electronic module to a holding device.

FIG. 2 shows a second exemplary embodiment of the device for supplying electrical energy and supplying data to an electronic module 3. Parts identical to the exemplary embodiment 1 are designated by the same reference numbers. In addition, an appliance housing 4 is provided to protect the individual components of the electronic module 3 and to hold them in a defined arrangement with respect to the holding device 1.

The energy supply part 2 of the electronic module 3 has a base element 23 that partially protrudes into the housing 4 and is detachably connected to the elongated holding device 1. The base element 23 contains the transmitting coil 20, which is held well insulated with respect to its neighborhood by means of a plastic housing. The plastic housing is secured on the support rail 10 by latching. The transmitting coil 20 contains a ferrite core 24 which bundles the alternating magnetic field and directs it towards the coils 31. The coils 31 and 32 can also contain ferrite cores, as indicated at 36 and 37. The shape of the ferrite cores 36, 37 does not have to be rod-shaped; backward-bent shapes are also possible so as to keep magnetic reluctance low.

In FIG. 2, the coupling line 46 is indicated as optical insulating distance. Data between the two electronics 41 and 42 are thus transferred via the insulating area of separation 33. The increased safety requirements can also be managed via inductive, capacitive or electromagnetic transmission methods. Recesses keeping a safety distance between them are provided in the housing 4 for the signal connectors 43 and 44.

Data signals modulated on the energy signals can also be transmitted via the coil systems 20, 31, 32. The different safety standards can be met here as well.

The operation of the electronic modules takes place as follows: An operating frequency of the alternating supply voltage is selected in accordance with the resonant frequency of the oscillating circuits. The alternating supply voltage 22 drives current through the transmitting coil 20, as a result of which an alternating magnetic field is produced, symbolized by the flux lines 50, 51, 52. Due to the inductive coupling, respective alternating currents are produced in the receiving coils 31 and 32, which alternating currents, at resonance of the coils, enable operating the load with higher efficiency. In practice, said load typically consists of a rectifier circuit, a smoothing capacitor and the electronics 41, 42 connected thereto. The electronics can be integrated on the circuit board or can be accommodated externally. The energy of the source thus travels via the magnetic fields into the respective electronics 41 or 42 in order to be available there as energy source for signal and data processing. The magnetic field symbolized by the flux lines 50, 51 also includes an energy portion that, in a way, is collected or compensated by the capacitor 53. Therefore, ideally, only that amount of electrical energy is fed into the system that is consumed by the electronics 41 and 42. As viewed from the electrical voltage supply 22, the load formed by the electronics appears as purely ohmic load under ideal resonance conditions.

Similar to the transmitting coil where the inductance is almost compensated by the capacitance 53, the inductance in the case of the receiving coils 31, 32 is almost compensated by the capacitances 54 and 55. These are the positive effects of resonant circuits.

The illustrated exemplary embodiment can be modified in different ways. Thus, the two receiving coils can be attached on different sides of the circuit board, wherein in this case, the circuit board can serve as separation area.

Furthermore, it is possible to use the alternating input voltage 22 for energy supply as well as for data signal input. For this, the energy can be transmitted via a carrier signal and the data signal can be transmitted as modulation. In the receiving coils, the energy signal is then separated from the data signal. Thus, the transmitting coil together with in each case one of the receiving coils forms a data signal coupling line.

Data signal transmission can also take place from the receiving coils to the transmitting coil, namely by means of the so-called method of load modulation, for example. In the respective electronics, type and magnitude of the load is changed which has retroactive effects on the current/voltage ratio in the transmitting coil so that these retroactive effects can be detected as data signal on the transmitting side. In the case of this data signal coupling line, subcarriers can be used to better separate the energy signal from the data signal.

Data exchange between the receiving coils is also possible since they magnetically coupled to one another. By suitably adding additional capacitance, for example, a second resonant frequency can be generated which is used as a carrier for data signals.

Instead of two receiving coils, it is also possible to group a plurality of receiving coils around the transmitting coil so as to operate multi-channel systems. The modules can be arranged in two, three or four separate planes and can be galvanically separated from one another. The data signal coupling line between the electronics of the different planes can be of optical, magnetic or capacitive nature.

What is claimed is:

1. A device for at least one of supplying electrical energy or supplying data to an electronic module, comprising:
an energy supply part that is installed in an elongated holding device and has a transmitting coil for producing an alternating magnetic field,
a first energy receiving part with a first receiving coil inductively coupled to the transmitting coil, and with a first electronics which is connected to the first receiving coil and which has first signal terminals,
a second energy receiving part with a second receiving coil inductively coupled to the transmitting coil, and with a second electronics which is connected to the second receiving coil and which has second signal terminals,
wherein the first energy receiving part comprising the first electronics and the second energy receiving part comprising the second electronics are accommodated on a common circuit board and form a portion of the electronic module which is accommodated in an appliance housing which can be secured on the holding device, and
wherein the first energy receiving part comprising the first electronics and the second energy receiving part comprising the second electronics are arranged galvanically separated from one another by an insulating area of separation which is located on the common circuit board and which is bridged by a data coupling line in order to exchange signals or data directly between the first electronics and the second electronics.

2. The device according to claim 1, wherein the coil system has at least one capacitive element for forming at least one resonance circuit of the transmitting system with the receiving system.

3. The device according to claim 2, wherein a transmitting capacitance for forming a transmit-resonance circuit with the transmitting coil is provided.

4. The device according to claim 2, wherein a first receiving capacitance for forming a first receive-resonance circuit is provided.

5. The device according to claim 2, wherein a second receiving capacitance for forming a second receive-resonance circuit is provided.

6. The device according to claim 1, wherein the transmitting coil is secured on a support rail of the holding device, and the circuit board is held by the appliance housing that is supported on the support rail.

7. The device according to claim 1, wherein the signal terminals of the first electronics represent signal input connectors and the signal terminals of the second electronics represent signal output connectors.

8. The device according to claim 1, wherein a plurality of first and second receiving coils are arranged in a plurality of planes of the circuit board.

9. The device according to claim 1, wherein the receiving coils are wound in a spirally manner.

10. The device according to claim 1, wherein the data signal coupling line represents an optical signal line.

11. The device according to claim 1, wherein the data signal coupling line consists of the magnetic coupling between coils.

12. The device according to claim 1, wherein the transmitting coil is formed with helical turns and a cylindrical contour for producing a field portion having flux lines which are axially parallel to the longitudinal extent of the holding device and in relation to which the receiving coils with their reception planes are arranged in the transverse direction.

13. The device according to claim 1, wherein a number of transmitting coils are arranged along the elongated holding device, and wherein a plurality of electronic modules can be positioned in a row along the holding device and can be secured on the holding device.

14. The device according to claim 1, wherein the energy supply part of the electronic module has a base element which protrudes into the appliance housing of the electronic module and is detachably connected to the elongated holding device and which contains the transmitting coil with good electrical insulation against the electronic module, wherein the transmitting coil contains a ferrite core which is arranged in a coupling relation with ferrite cores of the receiving coils.

15. The device according to claim 14, wherein the base element has a plastic housing and is provided with latching devices for latching onto a support rail of the holding device, and is placed in a defined arrangement relative to the appliance housing.

\* \* \* \* \*